United States Patent [19]
Marstiller et al.

[11] Patent Number: 5,155,334
[45] Date of Patent: Oct. 13, 1992

[54] MIRROR HEATER

[75] Inventors: John A. Marstiller, Marston Mills; Frederick G. J. Grise, deceased, late of Osterville, both of Mass., by Rita A. Grise, administrator

[73] Assignee: Flexwatt Corporation, West Wareham, Mass.

[21] Appl. No.: 668,194

[22] Filed: Mar. 12, 1991

[51] Int. Cl.⁵ .............................................. H05B 3/84
[52] U.S. Cl. .................................. 219/219; 219/528; 392/432
[58] Field of Search ............... 219/219, 528, 529, 549; 392/435, 436, 437, 432

[56] References Cited

U.S. PATENT DOCUMENTS

| | | | |
|---|---|---|---|
| 2,612,585 | 9/1952 | McCann | 219/549 |
| 3,160,736 | 12/1964 | Catterson | 219/219 |
| 3,530,275 | 9/1970 | Rust | 219/219 |
| 4,071,736 | 1/1978 | Kamerling | 219/219 |
| 4,197,449 | 4/1980 | Fessenden | 219/549 |

Primary Examiner—Teresa J. Walberg
Attorney, Agent, or Firm—Hale and Dorr

[57] ABSTRACT

A mirror heating system includes a sheet heater, sized and adapted to cover most of the back of the mirror surface, that can be mounted on the wall or other flat surface before the mirror is put into place. The system is designed so that, despite the needed electrical connections, the front and rear surfaces of the heating system remain essentially planar and parallel.

8 Claims, 3 Drawing Sheets

MIRROR HEATER

This invention relates to mirror heaters and, more particularly, to electrical sheet heaters designed for mounting directly behind a mirror mounted on a wall or other flat surface.

BACKGROUND OF INVENTION

Fogging of mirrors, particularly in bathrooms, has been a long-standing annoyance and problem. There have been a number of systems provided in attempts to eliminate the fogging, but none have been particularly successful. Among other things, available systems have been expensive, difficult to install, or compatible with only a few mirror types.

Accordingly, it is a principal object of the present invention to provide a heated mirror system that can be used with essentially any wall- (or other flat-surface-) mounted mirror, that is relatively inexpensive, and that can easily be installed.

SUMMARY OF THE INVENTION

The present invention provides a mirror heating system that includes a sheet heater, sized and adapted to cover most of the back of the mirror surface, that can be mounted either on the wall, or on the back of the mirror itself, before the mirror is mounted or hung in place. The system is designed so that, despite the needed electrical connections, the front and rear surfaces of the heating system remain essentially planar and parallel. The system is particularly adapted for use with mirrors that are temporarily hung using picture hooks or the like.

DESCRIPTION OF PREFERRED EMBODIMENT

Figure 1:
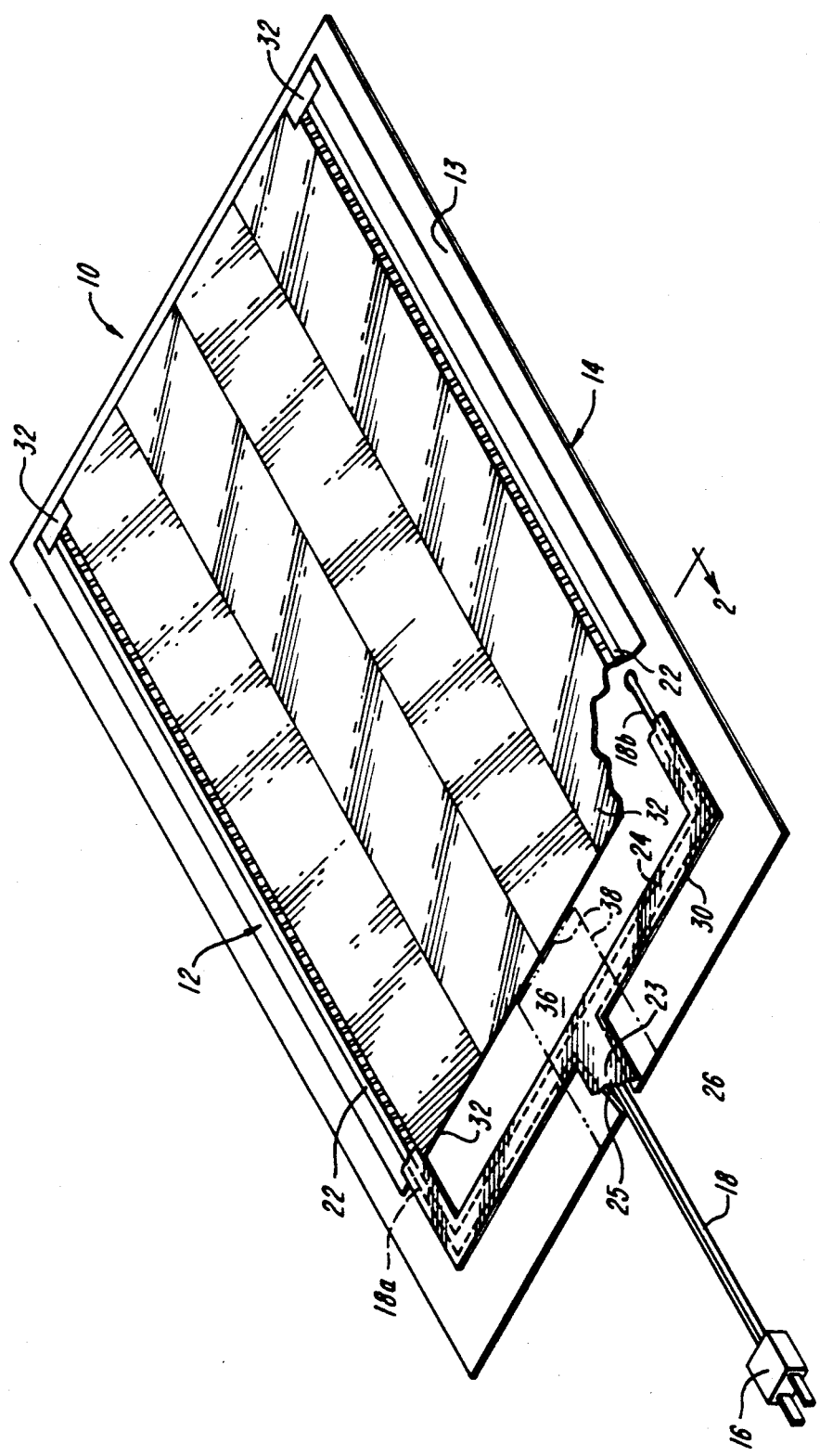
FIG. 1 is a perspective view of a heater system embodying the present invention.

Referring now to the drawings, FIG. 1 shows a heater system generally designated 10, including an electrical sheet heater 12 adhesively attached to the top 13 of a sheet 14 of finish cardboard or other insulating material. A male plug 16 is electrically connected to heater 12 by insulated wire 18, e.g., conventional double strand zip-cord.

In the illustrated embodiment, heater 12 is a heating element of the type sold as part no. UL-5-15-F-W by Flexwatt Corporation, the assignee of the present invention. Such heating elements are described in a number of already-issued patents of the assignee, including U.S. Pat. Nos. 4,485,297, 4,774,397 and 4,888,089 which are hereby incorporated by reference. Heater 12 includes a heating portion 20 comprising a pattern of semi-conductive material printed on the one side of an insulating sheet 21 of organic plastic material. A pair of longitudinally extending copper conductors 22 extend along the opposite sides of, and are electrically connected to, the heating portion 20. As described in the aforementioned U.S. patents, the conductors are held tightly in place by a second sheet 23 of insulating organic plastic material which overlies both the conductors 22 and the heating portion 20 and is sealed to the facing side of the plastic sheet 21. The two sheets of plastic sheet material form a hermetically sealed "sandwich", having an overall thickness of about 0.012 in., containing the electrical elements.

As shown in FIG. 1, the wires 18 from plug 16 are led through cut-out channels 23, 24 which extend through the thickness of cardboard backing 14 from the center of the bottom edge 26 of backing 14 to the points, under the adjacent ends of heating element 12, at which the wires are attached to conductors 22. As shown in FIG. 1, the sides of channel 23 diverge, upwardly from bottom edge 26, and the portions of the channel 23 on either side of wires 18 are filled with an epoxy cement 25. This arrangement helps insure that the wires 18 will stay in place if a user inadvertently pulls too hard on the plug 16. Rather than epoxy cement at 25, a polymeric material can be used to provide strain relief for the wiring.

The relative thickness of backing 14 and diameter of wire 18 are selected such that the wire in a channel 23, 24, will not project above the plane of the top of heater element 12 or below the plane of the bottom of backing 14. Typically, wire 18 will be #16 gauge to meet electrical code requirements, and each of the two insulated wire strands 18a, 18b of the zip-cord will have a thickness (diameter) of about 0.100 in. Backing 4 also should be about 0.100 in. thick so that the wire thickness will not prevent the back of the heating system 10 from being mounted flush against a wall, and a mirror to be mounted flush against the front of the heating system.

Figure 2:
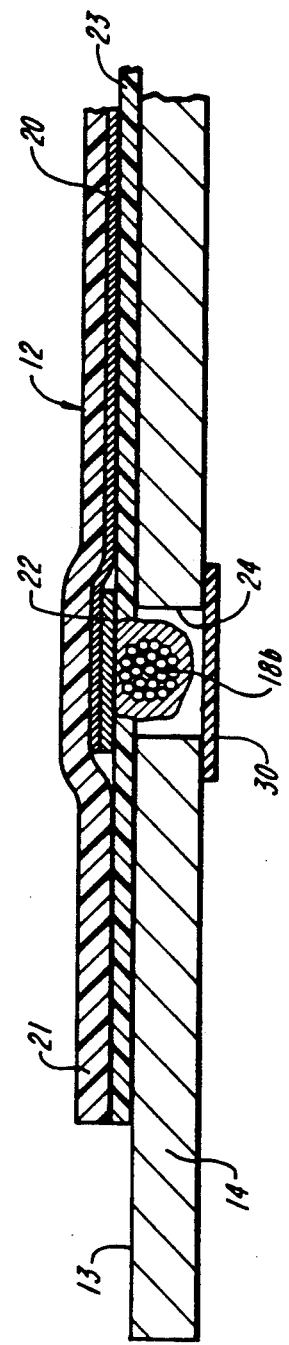
FIG. 2 is a section taken at 2—2 of FIG. 1.

To connect the wires 18 to the conductors 22 of heating element 12, the insulation is stripped from the ends of each of wires strands 18a, 18b, and each strand is connected to one of conductors 22. When a soldered connection is used, the heat applied during the soldering procedure melts the plastic sheet 23 overlying the conductor 22 and permits direct electrical contact between conductors 22 and the respective wire strands 18a, 18b. The overall height of the soldered connection is sufficiently small so that (as shown in FIG. 2) it lies entirely within the channel 24 rather than projecting below the bottom of the backing 14. In some circumstances, it also may be desirable to strip the entire portions of the wire strands 18a, 18b that underly the heating element 12, particularly if the dimensions of the wire or backing are such that the wire otherwise would project behind the plane of the back of backing 14.

In early embodiments of the present invention, strips 30 of dielectric tape (Dielectric Tape Type "Premium 111", Part No. 4453, Plymouth Bishop Insulating Products) were placed over channels 24, on both the top and bottom of cardboard backing 14. In currently preferred embodiments, the strips 30 are omitted and, instead, sheets of organic plastic (e.g., polyester film coated with a layer of a polyethylene hot melt adhesive) are laminated over the entire top and bottom of the device. In both types of embodiments, the ends of each conductor 22 at each end of the heater (which otherwise would be exposed when the element is cut from a longer roll of material) may be covered with dielectric tape strips 32 (3M Dielectric Tape Number 5).

As shown in FIG. 1, score lines 38 which cut partially through both the cardboard backing 14 and the dielectric strips 30 (or the laminated plastic sheets in currently preferred embodiments) provide a rectangular knockout portion 36 at the center bottom of heating system 10. Knockout 36 is of such a size that it will overlie a conventional junction box.

The heater system of FIG. 1 is particularly suited for use with a mirror that is temporarily hung. The heater system is attached (e.g., by mastic or other approved adhesive) to the back of the mirror, the mirror is then hung in any usual manner, and plug 16 is connected to a conventional outlet below or at one side of the mirror-heater assembly.

Figure 3:
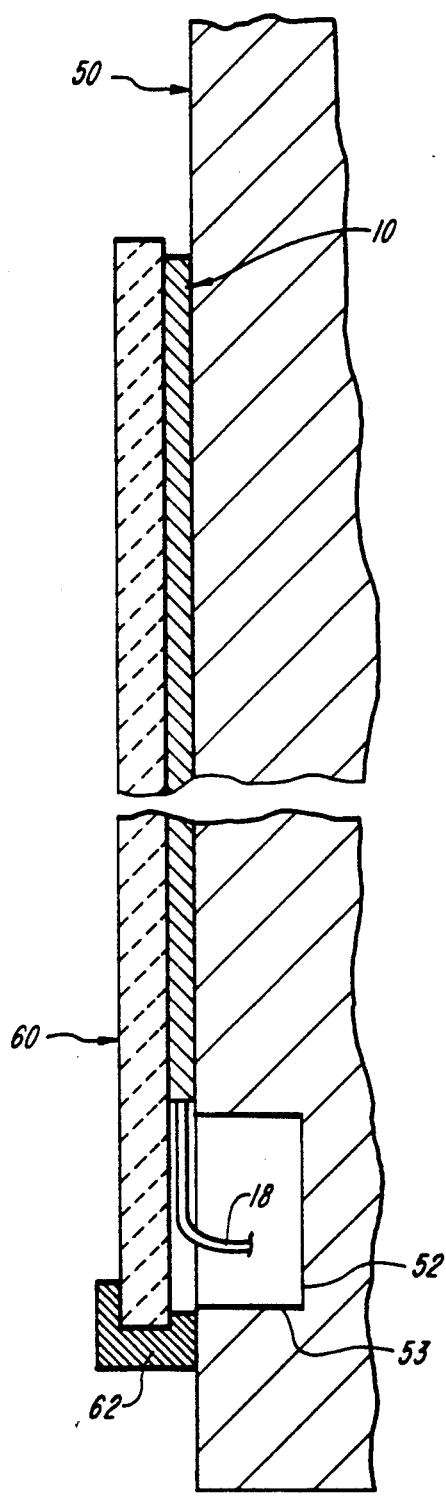
FIG. 3 is a sectional view illustrating a permanent typical installation of the heater system of FIG. 1.

FIG. 3 illustrates the manner in which a mirror-heater system such as system 10 may be more permanently mounted (e.g., by nails and screws at its four corners) on a wall or other mounting surface 50. A junction box 52 is positioned in the wall 50 with the bottom edge 53 of the junction box 52 essentially aligned with, or slightly above, the bottom edge 11 of heater system 10.

As will be apparent from FIG. 3, when a mirror heating system 10 is mounted over a junction box there is no plug 16 at the end of wire 18. Rather, the ends of wire 18 are stripped and connected to the wires in the junction box using wire nuts or any other standard connection technique. Also, to provide easy access to the junction box 52, the knock-out 36 has been removed, and the resulting opening overlies the junction box. In such a version, attached directly to a junction box, it is not necessary to provide as long a taper to channel 23, because there is less need for strain relief.

In heating systems that are initially designed and manufactured for permanent mounting on the wall, insulated stranded wire (without a plug) is typically used in lieu of zip-cord, and cut-out 36 is removed from backing 14 in the course of manufacture and before the plastic sheet is laminated to the front and back of the heating system. It is also possible to use solid or braided wire, although stranded is preferred for durability and cost.

After the heater is mounted on the wall, mirror 60 is installed over the front of the heater system with the flat back of the mirror flush against the front of the heater system. In the illustrated installation, mirror 60 is held in place using conventional mirror clips 62; alternatively it may be mounted using channels. It is also possible to attach the heating unit to the mirror during production, and to install it as a unit.

As will be apparent, one particular advantage of the heater system of the present invention is that, in making a permanent installation, the mirror heater may be mounted on the wall before it is attached to the mirror. This permits easy access to the junction box 52 both for making the necessary electrical connections and in insuring that any extra wires are neatly tucked into the box.

Other embodiments will be within the scope of the following claims.

What is claimed is:

1. A thin electrical heating system for mounting flush on a mounting surface and having a mirror or the like mounted flush on top of it, said system comprising:
    a backing sheet of electric insulating material having front and back surfaces that are generally planar and parallel to each other;
    a generally planar electric sheet heating element attached to the front surface of said backing sheet and having spaced apart conductive portions; and
    a pair of insulated connecting wires connected to respective spaced-apart conductive portions of said heating element,
    said backing sheet having channels therein extending from adjacent said portions of said heating element through a portion of said backing sheet to an edge of said backing sheet,
    said wires extending within said channels from adjacent respective ones of said heating element portions to said edge, and
    said wires, backing sheet, and heating element being selected and arranged such that the thickness of said wires is not greater than the combined thickness of said backing sheet and heating element, and the portion of said wires in said channels being between the plane of the top of said heating element and the plane of the back face of said backing sheet.

2. The heating system of claim 1 wherein said heating element has a pair of spaced apart conductors each of which includes one of said heating element portions, positioned adjacent an end of said heating element, for connection to a said connecting wire;

3. The heating system of claim 1 wherein said backing sheet has a length and width greater than that of said heating element, and said heating element is mounted thereupon to provide an area of said backing sheet that is not covered by said heating element adjacent the end of said heating element nearest said portions of said heating element and said channels extend through said end.

4. The heating system of claim 1 wherein each of said wires includes a wire core and surrounding insulation.

5. The heating system of claim 1 wherein one of said wires is connected by soldering to each of said portions, the thickness of said soldered portions of said wires being not greater than the thickness of said backing sheet.

6. The heating system of claim 5 wherein each of said portions is adjacent an end of said heating element, said heating element overlies a portion of each of said wires, and the insulation is stripped from the portion of each of said wires underlying said heating elements.

7. The heating system of claim 1 wherein said backing sheet includes a cut-out opening of size approximating that of a junction box.

8. The heating system of claim 1 including a mirror mounted substantially flush with and in face-to-face contact with the front surface of said heating element.

* * * * *